(12) United States Patent
Sugawara

(10) Patent No.: US 6,567,593 B1
(45) Date of Patent: May 20, 2003

(54) OPTICAL COMPONENT

(75) Inventor: Takeo Sugawara, Hamamatsu (JP)

(73) Assignee: Hamamatsu Photonics K. K., Shizuoka (JP)

( * ) Notice: Subject to any disclaimer, the term of this patent is extended or adjusted under 35 U.S.C. 154(b) by 0 days.

(21) Appl. No.: 09/672,788

(22) Filed: Sep. 29, 2000

Related U.S. Application Data

(63) Continuation-in-part of application No. PCT/JP99/01485, filed on Mar. 24, 1999.

(30) Foreign Application Priority Data

Apr. 1, 1998 (JP) .............................. 10-088805

(51) Int. Cl.⁷ ................................. G02B 6/04
(52) U.S. Cl. ................................. 385/115
(58) Field of Search .................... 385/120, 126, 385/127

(56) References Cited

U.S. PATENT DOCUMENTS

| | | | | |
|---|---|---|---|---|
| 3,275,428 A | * | 9/1966 | Siegmund | 65/393 |
| 3,715,150 A | * | 2/1973 | Love et al. | 385/120 |
| 4,000,416 A | * | 12/1976 | Goell | 359/116 |
| 4,759,604 A | * | 7/1988 | Utsumi et al. | 385/126 |
| 4,806,289 A | * | 2/1989 | Laursen et al. | 264/1.5 |
| 5,111,525 A | | 5/1992 | Hartouni | 385/126 |
| 5,933,560 A | * | 8/1999 | Ishiharada et al. | 385/115 |
| 5,940,565 A | * | 8/1999 | Sugawara | 385/115 |
| 6,043,930 A | * | 3/2000 | Inagaki | 359/341 |
| 6,174,604 B1 | * | 1/2001 | Akita et al. | 428/392 |

FOREIGN PATENT DOCUMENTS

| | | |
|---|---|---|
| JP | 3-248103 | 11/1991 |
| JP | 4-59608 | 9/1992 |
| JP | 6-174948 | 6/1994 |
| JP | 8-338916 | 12/1996 |

* cited by examiner

*Primary Examiner*—Lynn D. Feild
*Assistant Examiner*—Thanh-Tam Le
(74) *Attorney, Agent, or Firm*—Morgan, Lewis & Bockius LLP

(57) ABSTRACT

An optical component 10 has a plurality of optical fibers comprising a first clad 14, a core 15 formed around the first clad 14, and a second clad 16 formed around the core 14, arrayed regularly so that the fiber axes may be parallel to each other, having an incident plane 10*a* cut obliquely to the fiber axis and an exit plane 10*b* cut vertically to the fiber axis. The section of the first clad 14 is nearly circular, and the section (outer circumference) of the core 15 is a nearly regular hexagon with crushed corners.

6 Claims, 16 Drawing Sheets

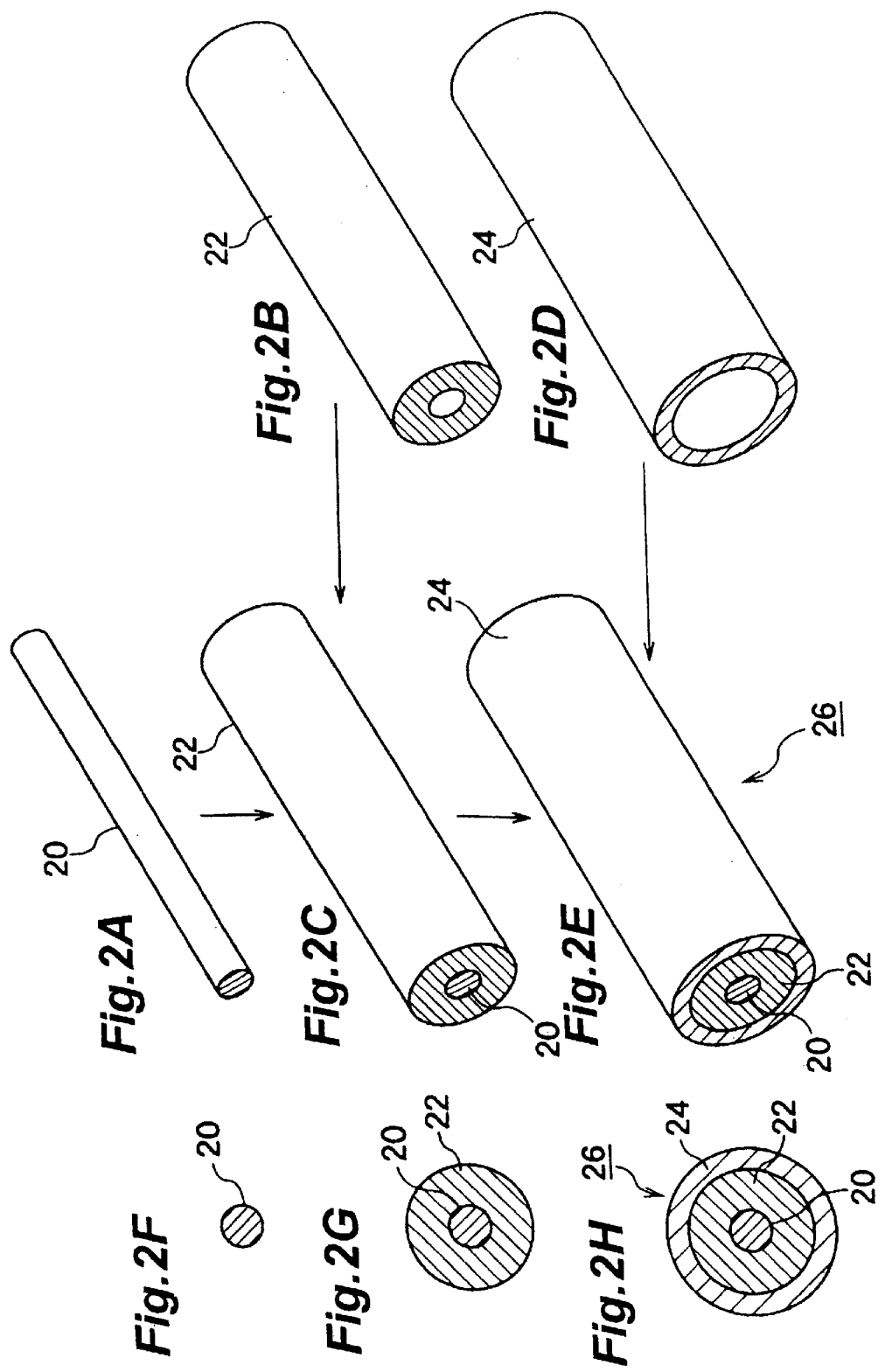

Fig.5A
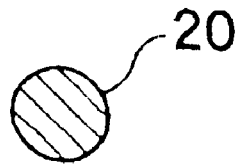
Fig.5B
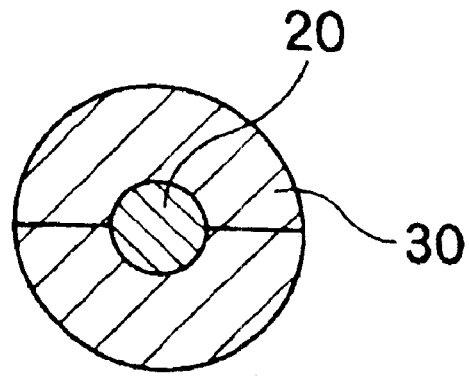
Fig.5C
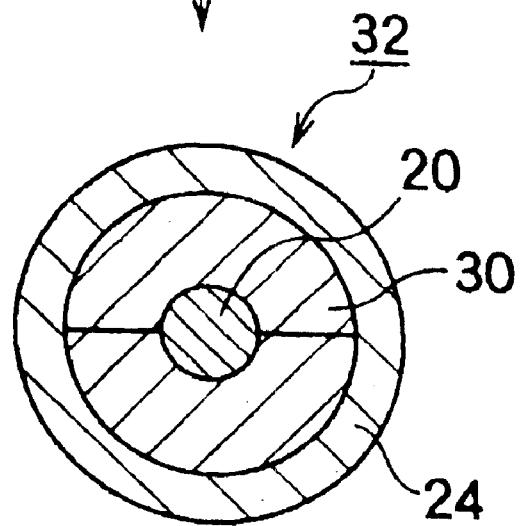

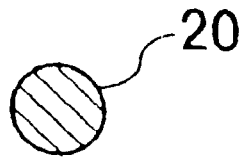
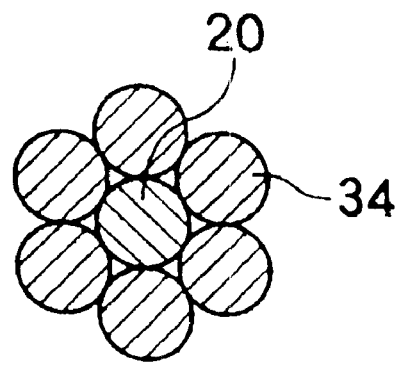
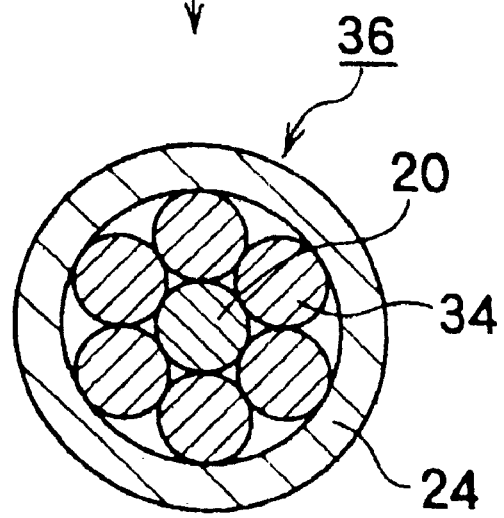

Fig.11A
Fig.11B
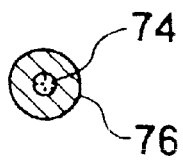
Fig.11C
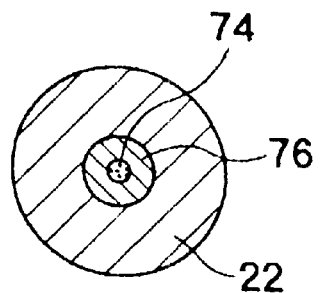
Fig.11D
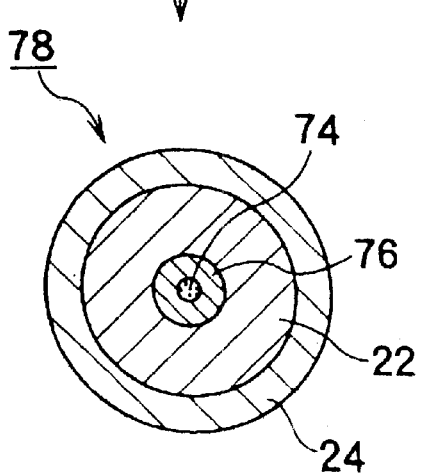

Fig.12A
Fig.12B
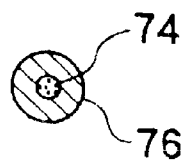
Fig.12C
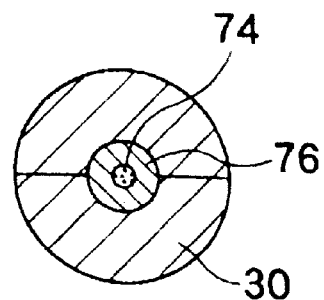
Fig.12D
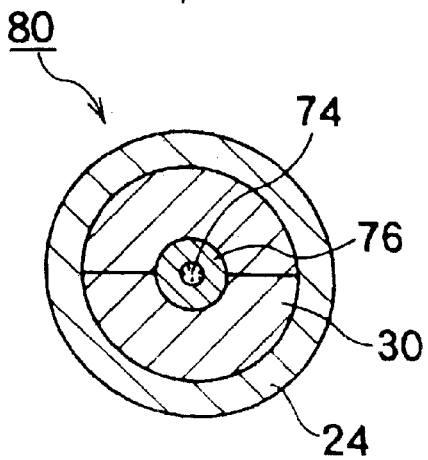

Fig.13A
Fig.13B
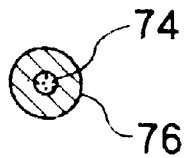
Fig.13C
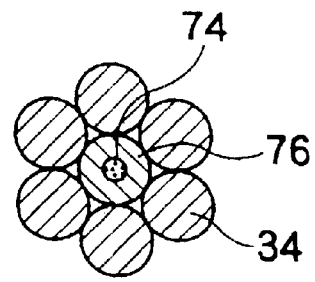
Fig.13D
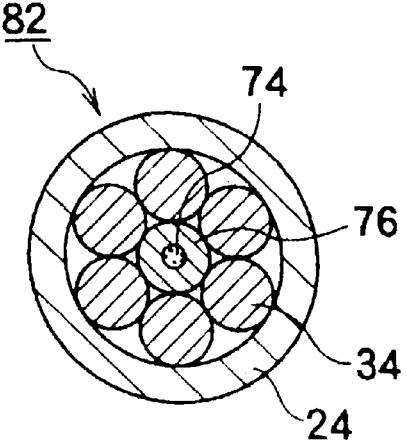

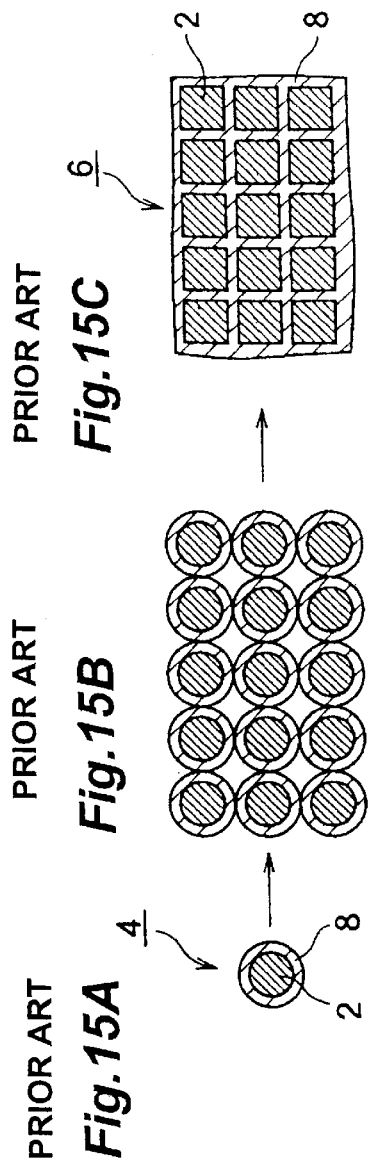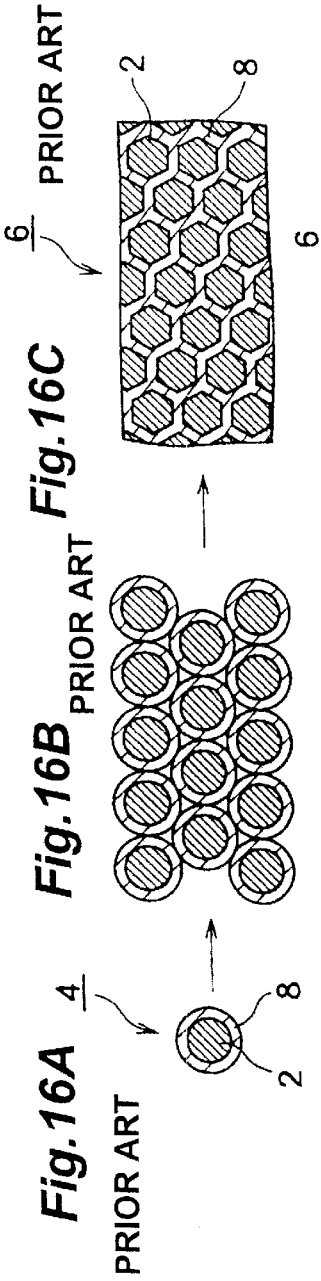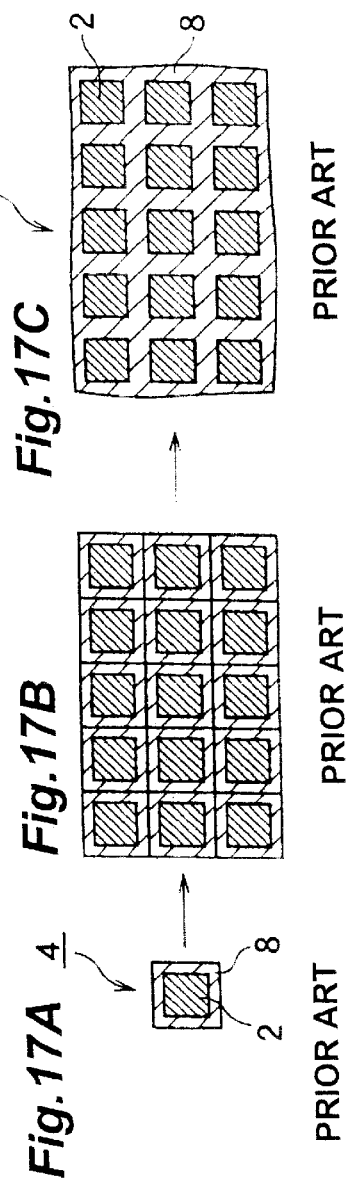

OPTICAL COMPONENT

RELATED APPLICATION

This is a continuation-in-part application of International Patent application serial No. PCT/JP99/01485 filed on Mar. 24, 1999, now pending.

BACKGROUND OF THE INVENTION

1. Field of the Invention

The present invention relates to an optical component composed by arraying a plurality of optical fibers.

2. Related Background Art

As an optical component for transmitting optical images, an optical component formed by arraying a plurality of optical fibers is widely known. The optical component has an incident plane and an exit plane exposing the core and clad of each optical fiber, and the optical image entering the incident plane is transmitted to the exit plane.

This optical component has numerous benefits including a high transmission efficiency and a smaller in size of optical system as compared with the lens, and is hence used in various fields such as fingerprint detecting system.

SUMMARY OF THE INVENTION

The optical component is usually manufactured by arraying and bundling a plurality of optical fibers in circular or square section, and forming integrally. Therefore, due to pressure at the time of integral forming, the section of the core of optical fibers for composing the optical component is transformed into polygonal shapes having mutually parallel diagonals such as square and hexagon, and the following problems occur.

That is, the light entering the incident plane with a specific incident angle is reflected repeatedly on the mutually parallel diagonals, and leaves the exit plane with a specific exit angle. As a result, a pattern having an intensity only in a specific exit angle is formed on the output image emitted from the exit plane, and this pattern becomes noise to lower the resolution of the optical component.

It is hence an object of the invention to solve such problems and prevent occurrence of pattern noise, and present an optical component of high resolution.

To solve the problems, the optical component of the invention is an optical component formed by arraying a plurality of optical fibers, in which each optical fiber comprises a first clad with a nearly circular section, a core formed around the first clad and having a refractive index larger than that of the first clad, and a second clad formed around the core and having a refractive index smaller than that of the core. In such configuration, the light entering the incident plane of the optical component is reflected repeatedly on the interface of the first clad and core and the interface of the core and second clad, and propagates through the core. Herein, since the section of the first clad is nearly circular, if the core is deformed to form mutually parallel opposite surfaces at the time of integral forming of the optical component, the situation of all light advancing like a band in the core is avoided, and it prevents formation of pattern having an intensity only in a specific exit angle. As a result, pattern noise is prevented, and an output image high in resolution can be obtained.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 2A to FIG. 2E are manufacturing process charts of optical fiber pair for composing the optical component.

FIG. 2F to FIG. 2H are sectional views of base materials manufactured in each process.

FIG. 5A to FIG. 5C are sectional view of base materials manufactured in each process.

FIG. 6A to FIG. 6C are sectional views of base materials manufactured in each process.

FIG. 11A to FIG. 11D are sectional views of base materials manufactured in each process.

FIG. 12A to FIG. 12D are sectional views of base materials manufactured in each process.

FIG. 13A to FIG. 13D are sectional views of base materials manufactured in each process.

FIG. 15A to FIG. 15C are manufacturing process charts of optical component in a prior art.

FIG. 16A to FIG. 16C are manufacturing process charts of optical component in a prior art.

FIG. 17A to FIG. 17C are manufacturing process charts of optical component in a prior art.

DESCRIPTION OF THE PREFERRED EMBODIMENTS

An optical component according to an embodiment of the invention is described below while ref erring to the drawings. First, the structure of the optical component of the embodiment is explained.

Figure 1A:
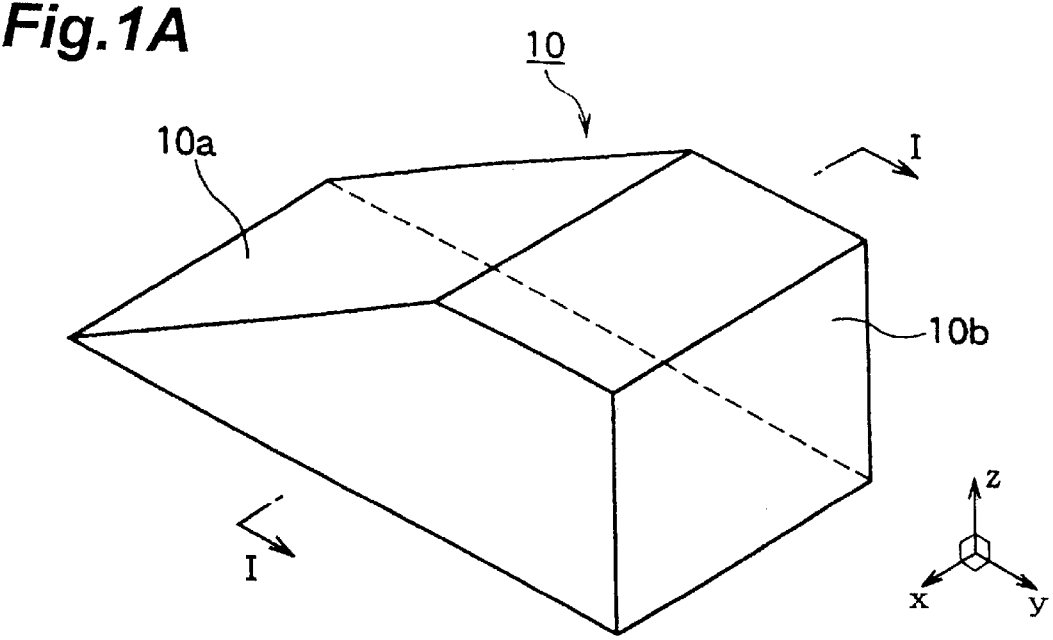
FIG. 1A is a perspective view of an optical component according to an embodiment of the invention.

FIG. 1A is a perspective view of the optical component of the embodiment. An optical component 10 is formed by arraying a plurality of optical fibers parallel to each other. Each optical fiber is arrayed so that its fiber axis may be parallel to the y-axis in FIG. 1A, and the optical component 10 has an incident plane 10a being cut obliquely to the fiber axis, and an exit plane 10b being cut vertically to the fiber axis, in which the input pattern entering the incident plane 10a is reduced and is emitted from the exit plane 10b.

Figure 1B:
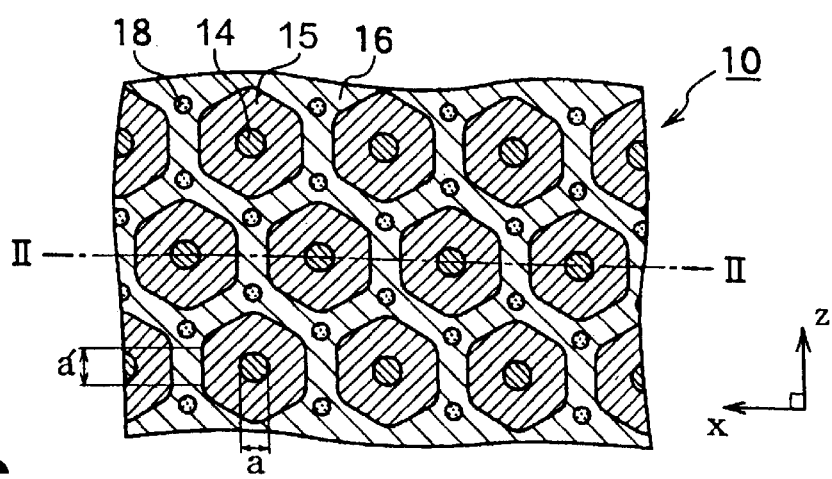
FIG. 1B is a magnified sectional view along line I—I in FIG. 1A.

FIG. 1B is a magnified sectional view being cut by a plane parallel to the xz plane along the line I—I in FIG. 1A. The optical component 10 has a plurality of optical fibers comprising a first clad 14, a core 15 formed around the first clad 14, and a second clad 16 formed around the core 15, arrayed regularly so that the fiber axes may be parallel to each other. Between the optical fibers, a light absorbent 18 is provided for removing stray light in the optical component 10, and the second clad 16 of each optical fiber is integrally formed by heating and pressing, and fills up the gap between adjacent optical fibers.

Further, in FIG. 1B, the section of the first clad 14 is nearly circular, and the section (outer circumference) of the core 15 is a nearly regular hexagon with crushed corners. To form the section of the first clad 14 and core 15 in such shape, in the optical fiber heating and pressing process, materials of the first clad 14, core 15, and second clad 16 should be selected so that the viscosity of the first clad 14 and second clad 16 may be larger than the viscosity of the core 15.

Herein, to prevent band-like progress (described later) of light as far as possible, it is advantageous when the diameter (a) of the first clad 14 is larger than the width (a') of the linear portion (or the portion close to the linear portion) of the section of the core 15, but in order to have a wider effective light receiving area (sectional area of core 15) on the incident plane 10a, the diameter (a) of the first clad 14 is preferred to be small. The width (b) of the second clad 16 for filling up the gap between cores is required to have a sufficient thickness to function as the clad, and in particular it is preferred to be more than ½ of the wavelength (550 nm) being used generally in the optical component 10.

In the optical component 10 of the embodiment, considering the effective light receiving area and resolution, the diameter (a) of the first clad 14 is about 2 μm, the width (a') of the flat portion of the section of the core 15 is about 4 μm, and the width (b) of the second clad 16 filling up the gap of cores is about 2 μm. The outside diameter of the core 15 is about 10 μm.

Figure 1C:
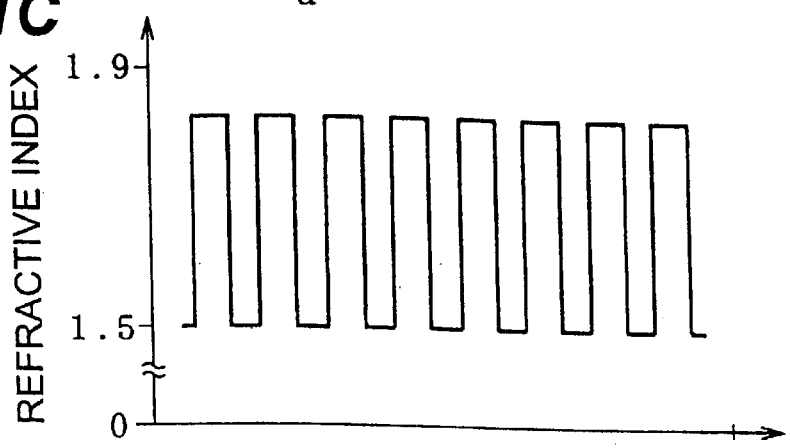
FIG. 1C is a diagram showing a refractive index distribution along line II—II in FIG. 1B.

The first clad 14 is made of, for example, borosilicate glass with refractive index $n_1$ of 1.495, the core 15 is made of, for example, Ba—La glass with refractive index $n_2$ of 1.82, and the second clad 16 is made of, for example, borosilicate glass with refractive index $n_3$ of 1.495. Therefore, the refractive index distribution along line II—II in FIG. 1B is as shown in FIG. 1C. As clear from the refractive indices of the first clad 14, core 15 and second clad 16, the refractive index $n_2$ of the core 15 is larger than the refractive index $n_1$ of the first clad 14, and the refractive index $n_3$ of the second clad 16 is smaller than the refractive index $n_2$ of the core 15. The refractive index $n_1$ of the first clad 14 and the refractive index $n_3$ of the second clad 16 are equal to each other.

A manufacturing method of the optical component of the embodiment is explained. FIG. 2A to FIG. 2E are manufacturing process charts of the optical fiber pair for composing the optical component 10, and FIG. 2F to FIG. 2H are sectional views of base materials and others manufactured in each process.

To manufacture the optical fiber for composing the optical component 10, in the first place, a first clad base material 20 having a circular columnar shape is manufactured (FIG. 2A, FIG. 2F). The first clad base material 20 is made of, for example, borosilicate glass with refractive index of 1.495, and its side surface is polished by seria polishing or other method.

In succession, the core base material 22 having a pipe shape manufactured separately as shown in FIG. 2B is filled up with the first clad base material 20 manufactured in the above process (FIG. 2C, FIG. 2G). Herein, the core base material 22 is made of, for example, Ba—La glass with refractive index of 1.82, and its inner surface and outer surface are polished by seria polishing or other method.

The first clad base material 20 placed in the core base material 22 manufactured in the above process is inserted into a second clad base material 24 having a pipe shape as shown in FIG. 2D, and a base material 26 for manufacturing an optical fiber is manufactured (FIG. 2E, FIG. 2H). Herein, the second clad base material 24 is made of, for example, borosilicate glass with refractive index of 1.495, and one bottom 24a of the second clad base material 24 is sealed by burner or other melting method.

Figure 3:
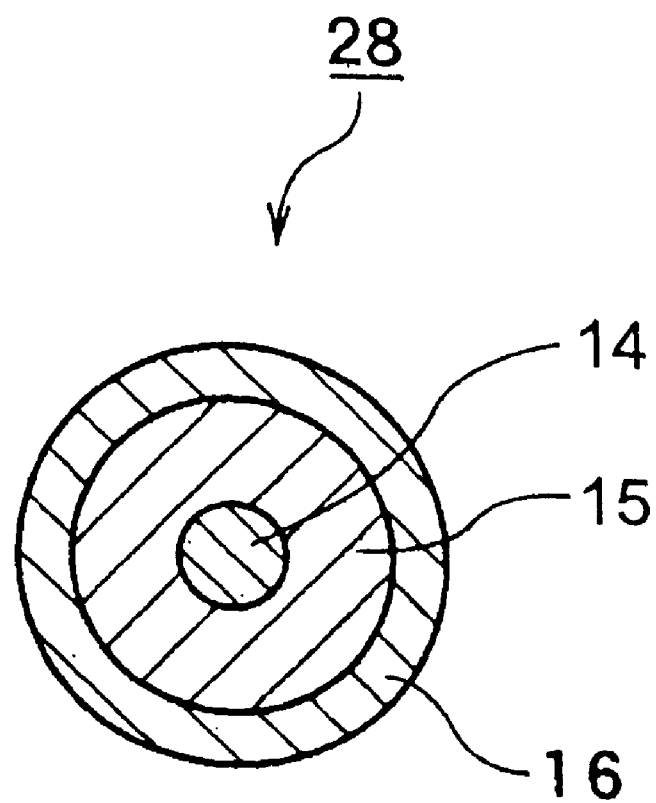
FIG. 3 is a magnified sectional view of optical fiber pair used in manufacture of the optical component.

Later, this base material 26 is drawn in wire, and an optical fiber is manufactured. A magnified sectional view of the optical fiber manufactured in this method is shown in FIG. 3. The optical fiber 28 is formed of the first clad 14 (refractive index $n_1$=1.495), core 15 (refractive index $n_2$=1.82) formed around the first clad 14, and a second clad 16 (refractive index $n_3$=1.495) formed around the core 15.

Figure 4:
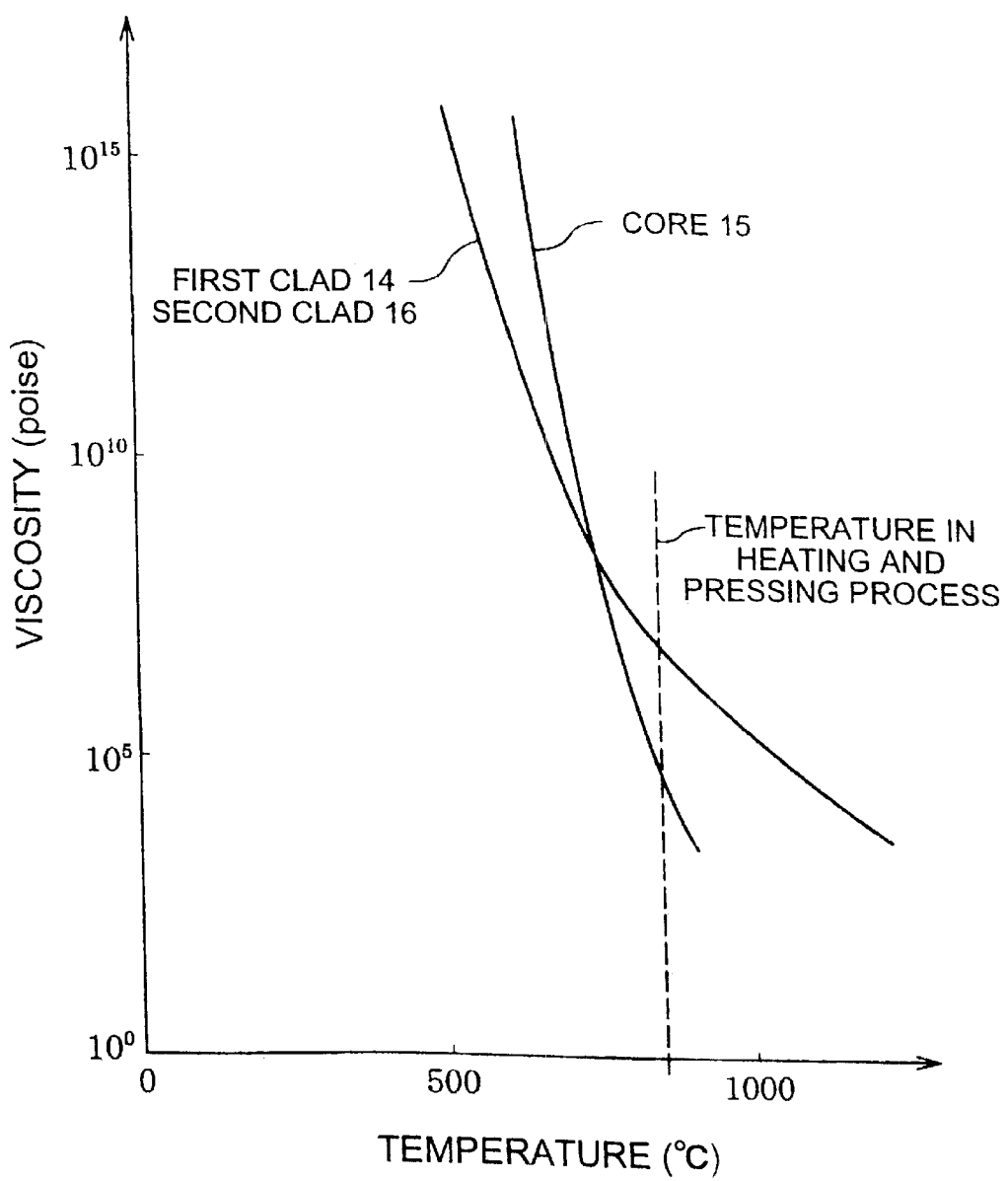
FIG. 4 is a diagram showing the relation between the ambient temperature and viscosity.

The plurality of optical fibers 28 thus manufactured in the above process are disposed parallel to each other while properly disposing the light absorbent 18 in the gaps thereof, and formed integrally by heating and pressing, so that the optical component 10 is manufactured. FIG. 4 shows changes of the viscosity of the first clad 14, core 15 and second clad 16 in relation to the ambient temperature. As known from FIG. 4, at the temperature (about 850° C. of heating and pressing process of the optical fiber, as compared with the viscosity of the core 15, the viscosity of the first clad 14 and second clad 16 is larger. From the viewpoint of strength of optical fibers, cracks are likely to occur when the difference in the coefficient of thermal expansion is large between the core 15 and the first clad 14 and second clad 16, and therefore the difference is preferred to be smaller. That is, if the coefficient of thermal expansion of the first clad 14 and second clad 16 is too small as compared with that of the clad core 15 (the difference is larger), a larger tensile stress occurs in the core 15, and the optical fiber is likely to crack.

The operation of the optical component in this embodiment is explained below. To begin with, problems of the optical component of the prior art are clarified. In manufacture of optical component according to the prior art, usually, a plurality of optical fibers with circular or square section are disposed and bundled parallel to each other, and formed integrally. Or, to enhance the resolution of the optical component, the bundled optical fiber group is further drawn in wires (multi-fibers), and disposed parallel, bundle and formed integrally, or by repeating the drawing process and bundling process plural times (multi-multi-fibers), the optical component is formed integrally.

In the manufacturing process of the optical component by such manufacturing method, changes in sectional shape of the core of each optical fiber are shown in FIG. 15A to FIG. 15C, FIG. 16A to FIG. 16C, and FIG. 17A to FIG. 17C. FIG. 15A to FIG. 15C show changes in sectional shape of a core 2 when an optical component 6 is formed by disposing optical fibers 4 with the core 2 having a circular section at four corners. When the optical component 6 is formed by disposing the optical fibers 4 with the core 2 having a circular section at four corners, as shown in FIG. 15A to FIG. 15C, by heating and pressing process when forming integrally by bundling the optical fibers 4, the section of the core 2 of each optical fiber 4 is deformed into a nearly square shape.

Herein, the degree of deformation varies with the hardness of the core 2 and clad 8 of the optical fiber 4 under temperature in the heating and pressing process. If the core 2 is extremely hard as compared with the clad 8, the core 2 can be maintained in a circular section, but in order to avoid mutual contact of adjacent cores 2, it is practically difficult to increase the hardness of the core 2 extremely as compared with the clad 8.

FIG. 16A to FIG. 16C show changes in the sectional shape of the core 2 when the optical component 6 is formed by disposing optical fibers 4 with the core 2 having a circular section at six corners. In this case, by heating and pressing process when forming integrally by bundling the optical fibers 4, the section of the core 2 of each optical fiber 4 is deformed into a nearly hexagonal shape. FIG. 17A to FIG. 17C show changes in the sectional shape of the core 2 when the optical component 6 is formed by disposing optical fibers 4 with the core 2 having a square section at four corners. In this case, since there is no gap between the adjacent clads 8 when disposing each optical fiber 4, the section of the core 2 is maintained in square even after heating and pressing process when forming integrally by bundling the optical fibers 4.

Figure 18A:
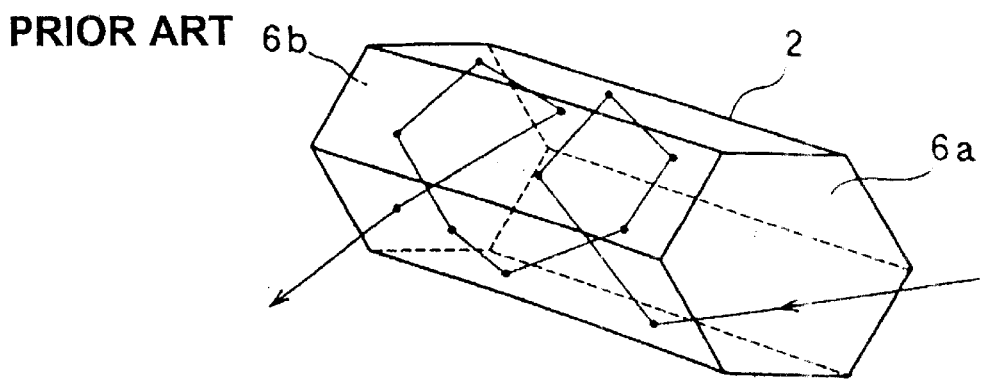
FIG. 18A to FIG. 18C are diagrams showing the mode of progress of light in the core of optical fiber for composing the optical component in a prior art.
Figure 18B:
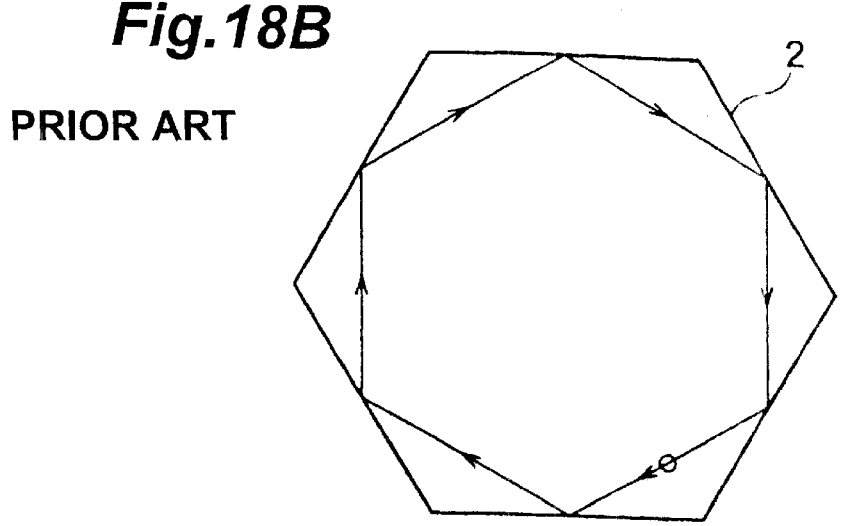
Figure 18C:
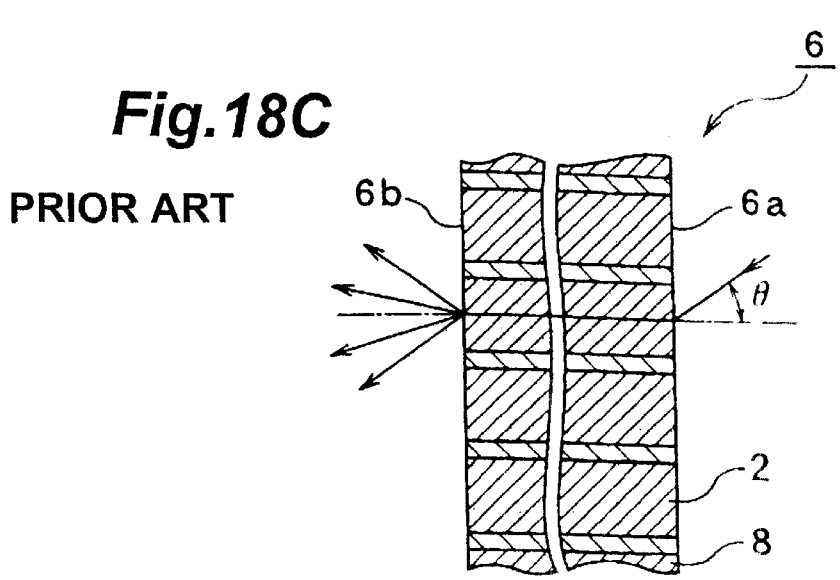
Figure 19A:
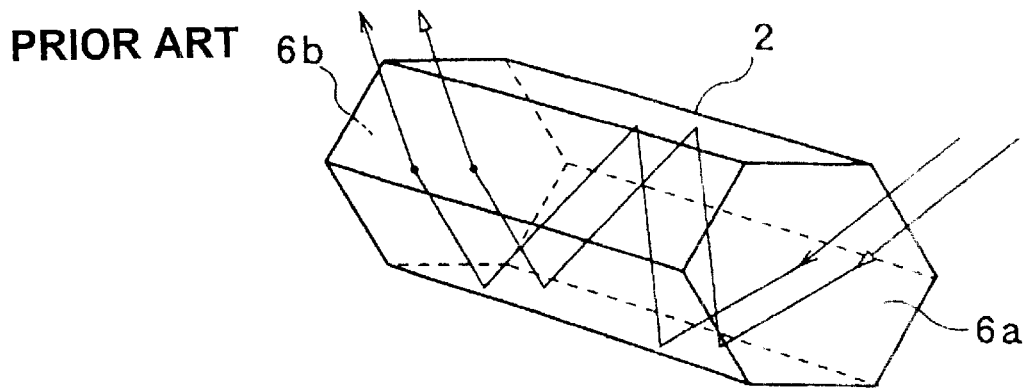
FIG. 19A to FIG. 19C are diagrams showing the mode of progress of light in the core of optical fiber for composing the optical component in a prior art.
Figure 19B:
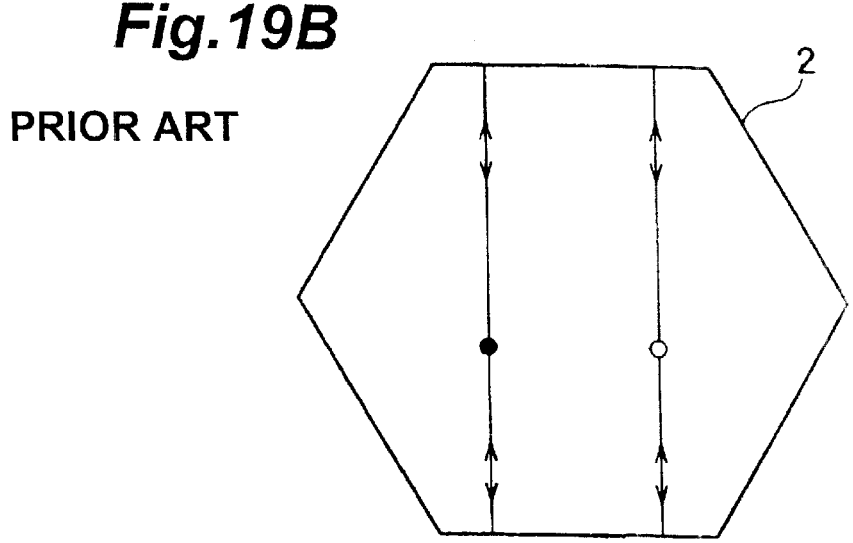
Figure 19C:
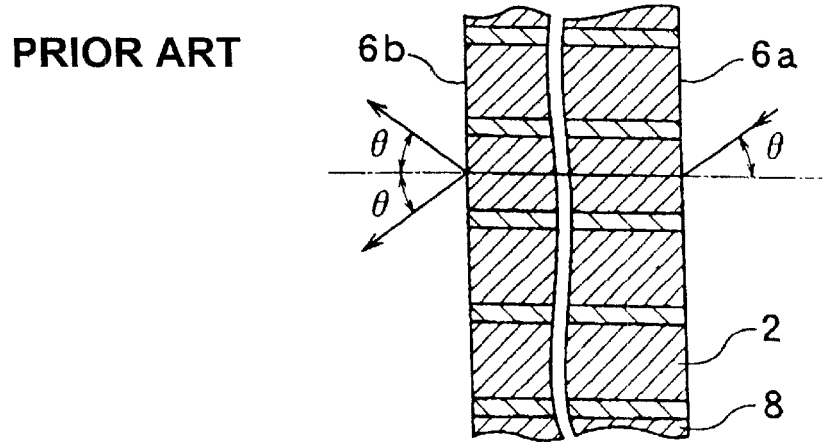

In thus manufactured optical components 6, since the section of the core 2 of each optical fiber 4 is a polygon having mutually parallel diagonals such as square and hexagon, the following problems are known. That is, the progress of the light entering the incident plane of the optical component 6 in the core 2 may take place in two modes, that is, spiral progress as shown in FIG. 18A to FIG. 18C, and band-like progress as shown in FIG. 19A to FIG. 19C. In FIG. 18A to FIG. 18C and FIG. 19A to FIG. 19C, the white circles and black circles show the light incident positions.

FIG. 18A shows the mode of progress of the light entering the incident plane (core 2 incident plane) 6a of the optical component 6 within the core 2, and FIG. 18B is a projection of the light progress locus on a plane parallel to the incident plane 6a. As shown in FIG. 18A and FIG. 18B, the light entering the incident plane 7a of the optical component 6 at random incident angles (excluding the specified incident angle explained in FIG. 19A to FIG. 19C) progresses spirally in the core 2. As a result, as shown in FIG. 18C, if the light enters the incident plane 6a of the optical component 6 at a specific incident angle θ, it is emitted at various exit angles from the exit plane 6b of the optical component 6 due to difference in the incident position.

On the other hand, as shown in FIG. 19A and FIG. 19B, the light entering the incident plane 6a of the optical component 6 at a specified incident angle (the incident angle allowing the light to reflect and progress only on the parallel opposite planes of the core 2) progresses in the core 2 in a band pattern. As a result, as shown in FIG. 19C, the light entering the incident plane 6a of the optical component 6 at specific incident angle θ is emitted from the exit 6b of the optical component 6 also at the same exit angle θ regardless of difference in the incident position. Therefore, in the output image emitted from the exit plane 6b of the optical component 6, a pattern having an intensity only in a specific exit angle is formed, and this pattern becomes noise to lower the resolution of the optical component 6. In particular, since the optical component manufactured by integrally forming multi-fibers (multi-multi-fibers) differs in the degree of deformation of the core 2 between the central part and edge part of the multi-fibers, pattern noise depending on the sectional shape of the multi-fibers is caused due to difference in the degree of deformation, and the resolution of the optical component 6 is extremely lowered.

By contrast, the optical component 10 of the embodiment is as follows. In the optical component 10, since each optical fiber comprises the first clad 14, core 15 formed around the first clad 14, and second clad 16 formed around the core 15, the light entering the incident plane 10a is reflected repeatedly on the interface of the first clad 14 and core 15 and the interface of the second clad 16 and core 15, and propagates in the core 15. Herein, for example, as shown in FIG. 1B, if the core 14 (core 15) is deformed when integrally forming the optical component 10, and mutually parallel opposite sides are formed, the light advancing in the core 15 is reflected not only on the interface with the second clad 16, but also on the interface with the first clad 14 having a nearly circular section, that is, a curved shape, so that the situation of band-like progress in the core 14 is avoided. Herein, as shown in FIG. 1B, if the diameter (a) of the first clad 14 is somewhat smaller than the width (a') of the linear portion of the section of the core 15, band-like progress of the light is substantially decreased. As a result, it prevents formation of pattern having an intensity only in a specific exit angle.

Further, in the optical component 10, since the refractive index $n_1$ of the first clad 14 and the refractive index $n_3$ of the second clad 16 are equal to each other, the critical angle at the interface of the core 15 and first clad 14 and the critical angle at the interface of the core 15 and second clad 16 are equal to each other.

The effects of the optical component of the embodiment are explained. In the optical component 10, by forming the optical fibers for composing the optical component 10 by the first clad 1 with a nearly circular section, core 15 formed around the first clad 14, and second clad 16 formed around the core 15, any pattern having an intensity only in a specific exit angle is not formed. As a result, pattern noise can be prevented, and an output image of a high resolution can be obtained from the exit plane 10b of the optical component 10.

Further, since the critical angle at the interface of the core 15 and first clad 14 and the critical angle at the interface of the core 15 and second clad 16 are equal to each other, the light of total reflection on the interface of the core 15 and first clad 14 is always reflected totally on the interface of the core 15 and second clad 16, and also the light of total reflection on the interface of the core 15 and second clad 16 is always reflected totally on the interface of the core 15 and first clad 14, so that light transmission of high efficiency is realized.

In the embodiment, in order to form the optical fibers 28 for composing the optical component 10, base materials 26 are formed in the method shown in FIG. 2F to FIG. 2H, the following method may be also applicable. That is, as shown in FIG. 5A to FIG. 5C, first, a first clad base material (FIG. 5A) having a circular columnar shape is manufactured, and two core base materials 30 having a shape of dividing a thick-wall cylinder into two sections at a plane vertical to the bottom are disposed around it (FIG. 5B). The first clad base material 20 surrounded with the core base materials 30 manufactured in this process is charged into a second clad base material 24 of pipe shape, and a base material 32 for manufacturing optical fiber is manufactured (FIG. 5C). One bottom 24a of the second clad base material 24 is sealed by burner or other melting method. The subsequent process, that is, formation of the optical fiber 28 by drawing the base material 32 in wire and formation of optical component 10 are same as mentioned above.

The base materials for forming the optical fibers 28 for composing the optical component 10 may be also manufactured in the following method. That is, as shown in FIG. 6A to FIG. 6C, a first clad base material 20 having a circular columnar shape is manufactured (FIG. 6A), and a plurality of core base materials 34 having a circular columnar shape are disposed around it (FIG. 6B). The first clad base material 20 surrounded with the core base materials 34 manufactured in the above process is put in a second clad base material 24 having a pipe shape, and a base material 36 for manufacturing optical fibers is made (FIG. 6C). One bottom 24a of the second clad base material 24 is sealed by burner or other melting method. The subsequent process, that is, formation of the optical fiber 28 by drawing the base material 36 in wire and formation of optical component 10 are same as mentioned above.

Figure 7A:
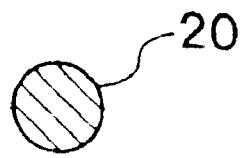
FIG. 7A to FIG. 7C are sectional views of base materials manufactured in each process.
Figure 7B:
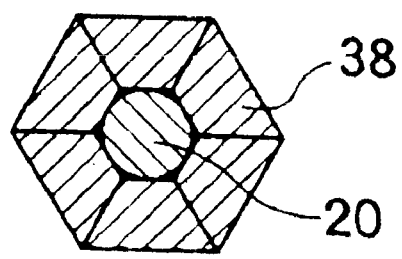
Figure 7C:
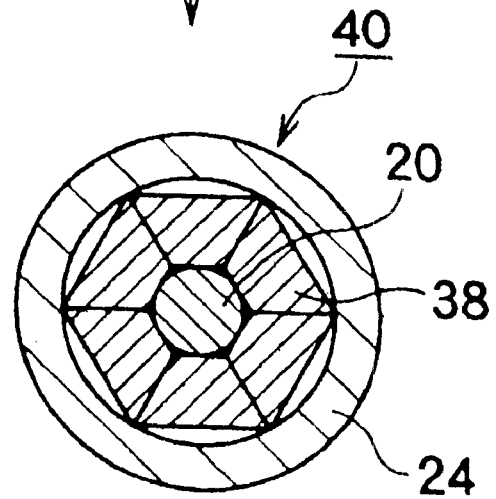

Further, the base materials for forming the optical fibers 28 for composing the optical component 10 may be also manufactured in the following method. That is, as shown in FIG. 7A to FIG. 7C, a first clad base material 20 having a circular columnar shape is manufactured (FIG. 7A), and a plurality of core base materials 38 having a square columnar shape are disposed around it (FIG. 7B). The first clad base material 20 surrounded with the core base materials 38 manufactured in the above process is put in a second clad base material 24 having a pipe shape, and a base material 40 for manufacturing optical fibers is made (FIG. 7C). One bottom 24a of the second clad base material 24 is sealed by burner or other melting method. The subsequent process, that is, formation of the optical fiber 28 by drawing the base material 40 in wire and formation of optical component 10 are same as mentioned above.

In the embodiment, the sectional structure of the optical component 10 is as shown in FIG. 1B, but various modified examples are considered as far as each optical fiber for composing the optical component 10 comprises a first clad 14 of a nearly circular section, a core 15 disposed around the first clad 14, and a second clad 16 disposed around the core 15.

Figure 8:
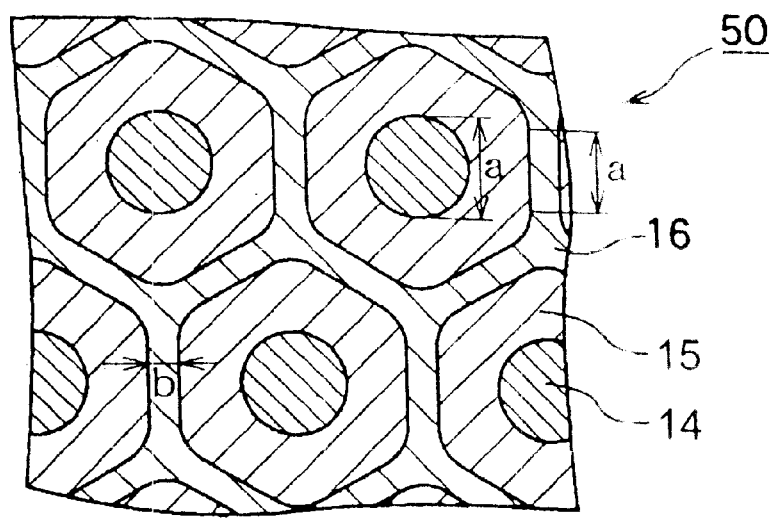
FIG. 8 is a magnified sectional view of an optical component according to a first modified example.

FIG. 8 is a magnified sectional view of an optical component 50 in a first modified example. What the optical component 50 differs from the optical component 10 in the first embodiment is that the optical component 50 does not have light absorbent 18. Further in the optical component 50, since the diameter (a) of the first clad 14 is larger than the width (a') of the linear portion (or the portion close to the linear portion) of the section of the core 15, it is possible to eliminate completely the band-like progress of the light mentioned in the prior art. It is required that the width (b) of the second clad 16 for filling up the gap of each core should have a sufficient thickness to function as the clad.

Figure 9:
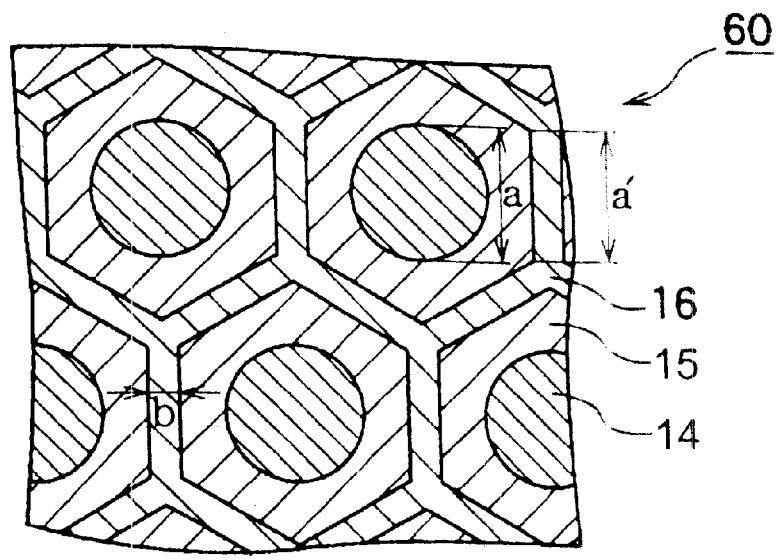
FIG. 9 is a magnified sectional view of an optical component according to a second modified example.

FIG. 9 is a magnified sectional view of an optical component 60 in a second modified example. What the optical component 60 differs from the optical component 50 of the first modified example is that the optical component 60 has a flat shape in the interface (outer circumference) of the core 15 whereas the optical component 50 has a curved shape in the interface (outer circumference) of the core 15. The optical component 60 having such sectional shape can be obtained by selecting the materials for the first clad 14, core 15 and second clad 16 so that the viscosity of the core 15 may be extremely small as compared with the viscosity of the first clad 14 and second clad 16 in the heating and pressing process of the optical fiber. In this case, too, in order to prevent the band-like progress of the light mentioned in the prior art as far as possible, it is advantageous when the diameter (a) of the first clad 14 is larger than the width (a') of the linear portion of the section of the core 15, but in order to increase the effective light receiving area (sectional area of the core 15) at the incident plane 10a, the diameter (a) of the first clad 14 is preferred to be smaller, and hence the diameter of the first clad 14 should be properly selected in consideration of the resolution, effective light receiving area, etc. It is also required that the width (b) of the second clad 16 for filling up the gap of each core should have a sufficient thickness to function as the clad.

Figure 10:
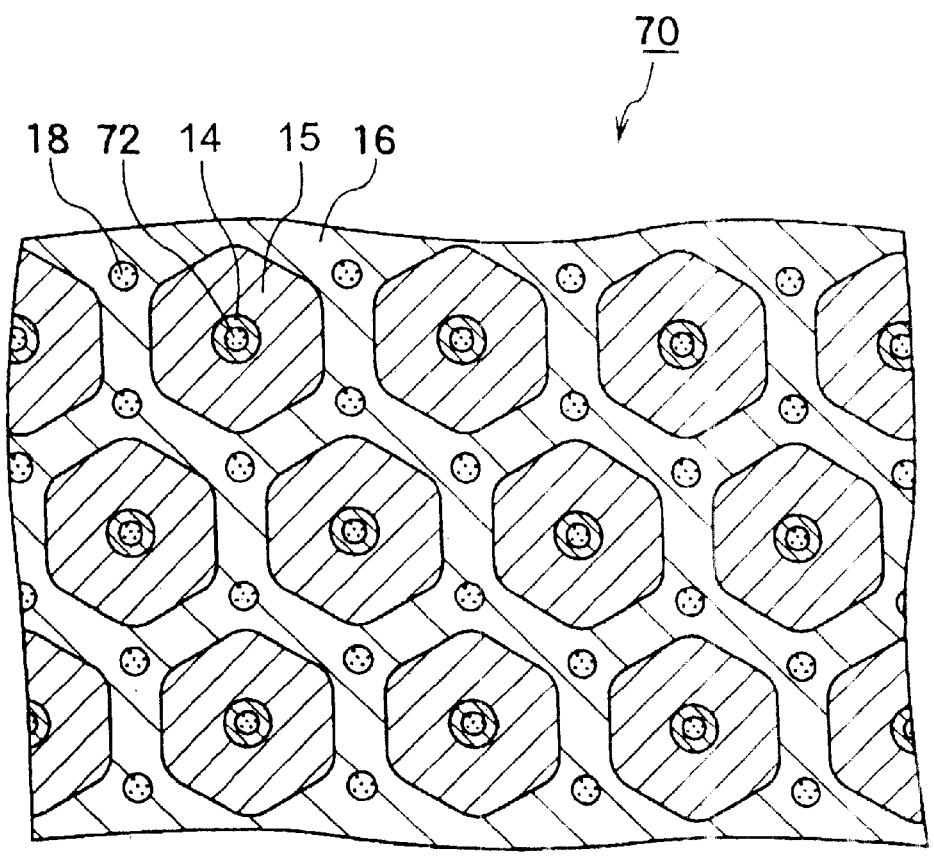
FIG. 10 is a magnified sectional view of an optical component according to a third modified example.

FIG. 10 is a magnified sectional view of an optical component 70 in a third modified example. What the optical component 70 differs from the optical component 10 in the first embodiment is that the optical component 70 has a light absorbent 72 provided in the first clad 14. By putting the light absorbent 72 in the first clad 14, the light advancing into the first clad 14 can be effectively removed by the light absorbent 72.

FIG. 11A to FIG. 11D are manufacturing process charts of the optical component 70 in the third modified example. To manufacture the optical fibers for composing the optical component 70, first, a circular columnar base material 74 for light absorbent is manufactured (FIG. 11A), and its surrounding is covered with a first clad base material 76, and a circular columnar first clad base material 76 is formed (FIG. 11B). Subsequent putting into the core base material 22 (FIG. 11C) and putting into the second clad base material 24 (FIG. 11D) are same as mentioned above. Thus manufactured base material 78 is drawn in wires, and formed integrally, and the optical component 70 is obtained.

Figure 14A:
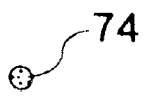
FIG. 14A to FIG. 14D are sectional views of base materials manufactured in each process.
Figure 14B:
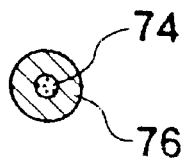
Figure 14C:
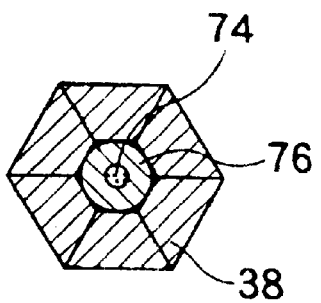
Figure 14D:
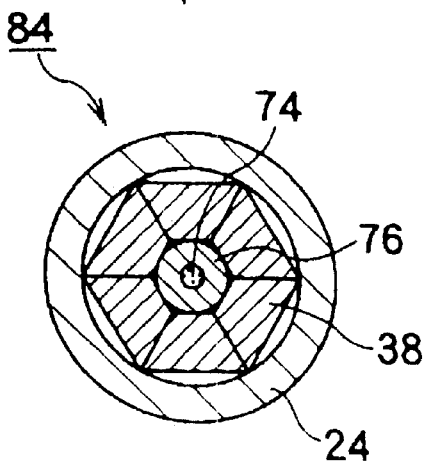

The optical component 70 of the third modified example may be also manufactured in the methods as shown in FIG. 12A to FIG. 12D, FIG. 13A to FIG. 13D, and FIG. 14A to FIG. 14D. That is, in the process of disposing the core base material around the first clad base material 76, two core base materials 30 having a shape of dividing a thick-wall cylinder into two sections at a plane vertical to the bottom maybe disposed (FIG. 12C), a plurality of core base materials 34 having a circular columnar shape may be disposed (FIG. 13C), or a plurality of core base materials 38 having a square columnar shape may be disposed (FIG. 14C).

The optical components 10, 50, 60, and 70 in the foregoing embodiments are optical parts formed by arraying a plurality of optical fibers parallel to each other, but the optical components may be formed in a taper shape for emitting the light entering the incident plane in a magnified or reduced image, by arraying a plurality of optical fibers in a curved form.

To enhance the resolution of the optical component, it is efficient that each optical fiber is multi-fiber that is made by bundling a plurality of unit optical fibers and drawing them in wires, and transmit the optical image entering one end to the another. In this case, each unit optical fiber comprises a first clad with a nearly circular section, a core formed around said first clad and having a refractive index larger than that of the first clad, and a second clad formed around said core and having a refractive index smaller than that of the core. And the second clad of each optical fiber is integrally formed by heating.

This optical component has numerous benefits including a high transmission efficiency and a smaller in size of optical system as compared with the lens, and is hence used in various fields such as fingerprint detecting system and radiation detector.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical component formed by arraying a plurality of optical fibers, wherein each optical fiber is a multi-fiber made by bundling a plurality of unit optical fibers and drawing the plurality of unit fibers in wires, and transmits an optical image entering one end to another, wherein each unit optical fiber comprises a first cladding, a core formed around said first cladding and having a refractive index larger than that of the first cladding, and a second cladding formed around said core and having a refractive index smaller than that of the core, wherein said core is made of solid material and the sectional shape of said core is a nearly polygonal shape having at least two sides opposed to each other which are parallel to each other; and wherein the second cladding of each optical fiber is integrally formed by heating.

2. An optical component formed by arraying a plurality of optical fibers, wherein each optical fiber comprises a first cladding, a core formed around said first cladding and having a refractive index larger than that of the first cladding, and a second cladding formed around said core and having a refractive index smaller than that of the core, wherein said core is made of solid material, and the sectional shape of said core is a nearly polygonal shape having at least two sides opposed to each other which are parallel to each other; and wherein the refractive index of said first cladding and the refractive index of said second cladding are equal to each other.

3. An optical component according to claim 1, wherein said first cladding has a nearly circular section.

4. An optical component according to claim 1, wherein a maximum diameter (a) of said first cladding is not less than a minimum length (a') of a side of the polygonal shape of said core.

5. An optical component according to claim 2, wherein said first cladding has a nearly circular section.

6. An optical component according to claim 2, wherein a maximum diameter (a) of said first cladding is not less than a minimum length (a') of a side of the polygonal shape of said core.

* * * * *